(12) United States Patent
Komori et al.

(10) Patent No.: US 8,257,460 B2
(45) Date of Patent: Sep. 4, 2012

(54) FILTER ELEMENT AND SOOT FILTER HAVING GEOMETRICALLY SIMILAR CHANNELS

(75) Inventors: Teruo Komori, Ogaki (JP); Bernd Reinsch, Ludwigsburg (DE); Lars Thuener, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 609 days.

(21) Appl. No.: 12/067,405

(22) PCT Filed: Sep. 12, 2006

(86) PCT No.: PCT/EP2006/066289
§ 371 (c)(1),
(2), (4) Date: Nov. 4, 2009

(87) PCT Pub. No.: WO2007/033921
PCT Pub. Date: Mar. 29, 2007

(65) Prior Publication Data
US 2010/0037573 A1    Feb. 18, 2010

(30) Foreign Application Priority Data

Sep. 20, 2005  (DE) .................. 10 2005 044 764
Jul. 28, 2006  (DE) .................. 10 2006 035 053

(51) Int. Cl.
*B01D 46/00* (2006.01)
*B01D 39/14* (2006.01)
*B01D 39/20* (2006.01)

(52) U.S. Cl. ............... 55/523; 55/DIG. 30; 422/177; 422/180; 428/116

(58) Field of Classification Search ............... 55/484, 55/523, 583.3, DIG. 30; 422/177, 180; 428/116
See application file for complete search history.

(56) References Cited

U.S. PATENT DOCUMENTS

| | | | |
|---|---|---|---|
| 3,436,192 A   | 4/1969  | Karlsson | |
| 3,853,485 A * | 12/1974 | Hogan .......................... | 502/300 |
| 3,963,504 A * | 6/1976  | Lundsager ..................... | 501/82 |
| 4,276,071 A * | 6/1981  | Outland ......................... | 55/523 |
| 4,364,761 A * | 12/1982 | Berg et al. ..................... | 55/523 |
| 5,108,685 A * | 4/1992  | Kragle ..................... | 264/177.12 |
| 5,593,646 A * | 1/1997  | Koshiba et al. ............... | 422/177 |
| 5,641,332 A * | 6/1997  | Faber et al. .................... | 55/523 |
| 5,866,230 A * | 2/1999  | Maus ............................. | 428/116 |
| 6,391,421 B1* | 5/2002  | Bruck et al. .................. | 428/116 |
| 6,444,006 B1* | 9/2002  | Haberkamp et al. ........... | 55/521 |
| 6,544,310 B2* | 4/2003  | Badeau et al. ................ | 55/385.3 |
| 6,582,490 B2* | 6/2003  | Miller et al. .................. | 55/520 |
| 7,056,365 B2* | 6/2006  | Ichikawa et al. .............. | 55/523 |

(Continued)

FOREIGN PATENT DOCUMENTS

EP    0900922    3/1999

(Continued)

OTHER PUBLICATIONS

International Search Report, PCT International Patent Application No. PCT/EP2006/066289, dated Dec. 6, 2006.

*Primary Examiner* — Robert Clemente
(74) *Attorney, Agent, or Firm* — Kenyon & Kenyon LLP

(57) ABSTRACT

A filter element and a soot filter are provided, in which resistance against thermal shocks is improved due to the channel geometry.

17 Claims, 4 Drawing Sheets

U.S. PATENT DOCUMENTS

| | | | |
|---|---|---|---|
| 7,238,217 B2 * | 7/2007 | Cutler et al. | 55/523 |
| 7,244,284 B2 * | 7/2007 | Miwa et al. | 55/523 |
| 7,247,184 B2 * | 7/2007 | Frost | 55/523 |
| 7,429,285 B2 * | 9/2008 | Kuki et al. | 55/523 |
| 7,575,793 B2 * | 8/2009 | Aniolek et al. | 428/116 |
| 7,655,195 B1 * | 2/2010 | Ichikawa et al. | 422/180 |
| 7,967,887 B1 * | 6/2011 | Yonushonis et al. | 55/523 |
| 2005/0066639 A1 | 3/2005 | Frost | |

FOREIGN PATENT DOCUMENTS

| | | |
|---|---|---|
| EP | 1260683 | 11/2002 |
| JP | 5-118211 | 5/1993 |
| JP | 5-321633 | 12/1993 |
| JP | 6-23215 | 2/1994 |
| JP | 7-19026 | 1/1995 |
| JP | 9-313849 | 12/1997 |
| JP | 2001-334114 | 12/2001 |
| JP | 2002-355511 | 12/2002 |
| JP | 2003-514180 | 4/2003 |
| JP | 2003-126629 | 5/2003 |
| WO | WO 01/34281 | 5/2001 |
| WO | WO 02/10562 | 2/2002 |
| WO | WO 2005/002709 | 1/2005 |

* cited by examiner

FILTER ELEMENT AND SOOT FILTER HAVING GEOMETRICALLY SIMILAR CHANNELS

FIELD OF THE INVENTION

The present invention relates to a filter element for purifying exhaust gases of an internal combustion engine. Filter elements of this type are used, for example, as soot filters for diesel engines.

BACKGROUND INFORMATION

The filter elements are often made of a ceramic material and have a plurality of inlet channels and outlet channels running parallel to each other.

Filter elements made of ceramic materials are manufactured by extrusion. This means that the blank of the filter element is a prismatic body having a plurality of channels running parallel to each other. The channels of a blank are initially open at both ends.

For the exhaust gas to be purified to flow through the walls of the filter, one group of channels is closed at the downstream end of the filter element, while another group of the channels is closed at the upstream end of the filter element. Two groups of channels are thus formed, namely the so-called inlet channels, which are closed at their downstream ends, and the so-called outlet channels, which are closed at the upstream ends of the filter element.

A flow connection exists between the inlet channels and the outlet channels only through the porous walls of the filter element, so that the exhaust gas of the filter element may only flow through by flowing from the inlet channels through the walls of the filter element into the outlet channels.

In order to ensure an optimally effective operation of the filter element, a most uniform temperature distribution possible over the cross-section of the filter element during the operation of the internal combustion engine is strived after.

SUMMARY

An object of the present invention is to provide a filter element for a soot filter and a soot filter in which the temperature distribution over the cross-section of the filter element and consequently the operational behavior of the soot filter equipped with the filter element according to the present invention are improved and its service life is extended.

This object may be achieved according to the present invention in, for example, a filter element for filtering diesel exhaust particulates, in particular for filtering exhaust gases of a diesel engine, having a longitudinal axis running parallel to the main direction of flow of the exhaust gas, having a plurality of inlet channels running parallel to the longitudinal axis and a plurality of outlet channels running parallel to the longitudinal axis, the inlet channels starting at an inlet face of the filter element and being closed at an outlet face of the filter element, and the outlet channels being closed at the inlet face and ending at the outlet face, in that the channels situated outside on the filter element have a greater cross-section area than the centrally situated channels.

The channels outside on the filter element having the large cross-section areas offer a lower flow resistance to the inflowing exhaust gas, so that, compared to a conventional filter element having the same size channel cross section, a larger proportion of the exhaust gases to be filtered is filtered on the periphery of the filter element. The temperatures on the periphery of the filter element are thus increased due to the increased flow rate of exhaust gases and thus overall more uniform temperatures over the entire cross section of the filter element are achieved. The exhaust gas flow through the center of the filter element is reduced to the same degree, which results in a reduction of the temperatures prevailing inside the filter element.

The temperature distribution within the filter element according to the present invention may be further improved by the channels of the filter element situated farthest outside being closed at both ends. This means that no exhaust gas flows through these channels, but there is air inside these channels, which is used for thermal insulation. This strongly reduces the heat transfer of part of the filter element to the environment and, consequently, the temperature drop at the periphery of the filter element. This results in a further improved temperature distribution and shorter warm-up time of the filter element according to the present invention.

In another advantageous embodiment of the present invention it is provided that the radial walls between two adjacent channels be offset with respect to each other. The filter element according to the present invention thus becomes more flexible in the radial direction and the thermal stresses in the radial direction are reduced. This improves the resistance of the filter element according to the present invention against rapid temperature changes which otherwise could possibly result in cracks and thus in failure of the filter element.

In an advantageous embodiment of the present invention, the cross-section area of the channels increases monotonously with increasing distance to the longitudinal axis of the filter element. This means that the temperature distribution within the filter element may be influenced in broad limits via the functional relationship between the distance of the channel to the center of the filter element and its cross-section area.

From the manufacturing point of view, it may, however, also be advantageous if the cross-section area of the channels increases in one or more stages with increasing distance to the longitudinal axis of the filter element.

If the cross-section area of the inlet channels is greater than the cross-section area of the adjacent outlet channels, the capacity of the filter element for deposition of diesel particulates is increased without a considerable increase in the exhaust gas counterpressure.

It has also been found advantageous if the filter element is rotationally symmetrical or centrally symmetrical with respect to its longitudinal axis.

It has also been found advantageous if the upstream area of the (inlet) channels has a non-planar design, so that it has a slope locally which is different from that of a plane in which the entire wall is situated. The upstream area is thus greater compared with conventional filter devices. As a result, a larger quantity of particles may deposit there without an inadmissible increase in the pressure drop occurring during the flow through the filter wall. In turn, as a result, the filter element according to the present invention has to be regenerated less frequently, which reduces the fuel quantity required for regeneration overall. The fuel consumption may thus be reduced without increasing the overall dimensions of the filter device. The increase in the area available for deposition of the particles is caused at least essentially by the non-planar design of the surface. The non-planar surface thus results in no or at least not excessive additional manufacturing costs.

The above-mentioned advantages may also be achieved using a soot filter having a filter element, a housing, a feed line, and an outlet line, a diffusor connecting the feed line to the housing and a cone connecting the housing to the outlet line, by using a filter element according to the present invention.

Further advantages and advantageous example embodiments of the present invention are presented in the figures and are described in detail below. All features shown in the figures described below may be used in the present invention either individually or in any combination.

DETAILED DESCRIPTION OF EXAMPLE EMBODIMENTS

Figure 1:
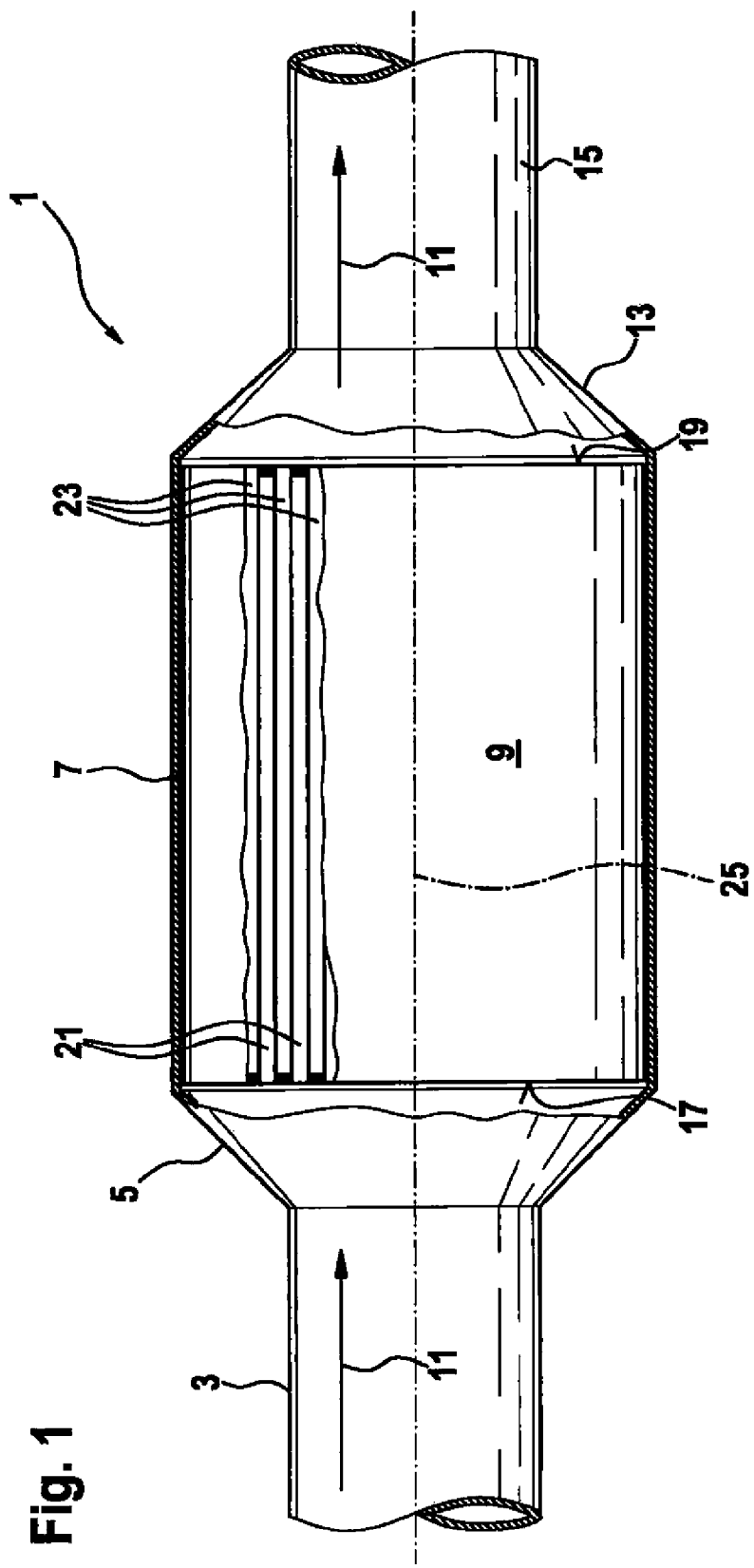
FIG. 1 shows a soot filter having a filter element according to the present invention in a side view.

FIG. 1 shows a soot filter 1 having a feed line 3, a diffusor 5, a housing 7, and a filter element according to the present invention 9 in a partially sectioned side view.

The flow passes through soot filter 1 in the direction of arrows 11. Housing 7 is connected to a cone 13 and an outlet line 15. Filter element 9 is gas-tightly connected to the housing, so that the exhaust gas (not depicted) entering through feed line 3 must flow through filter element 9.

Filter element 9 has an inlet face 17 and an outlet face 19. A plurality of channels extending from inlet face 17 to outlet face 19 pass through filter element 19.

For the exhaust gas to be forced to flow through the walls (having no reference numeral) of filter element 9, inlet channels 21 are open at inlet face 17 and closed at outlet face 19. So-called outlet channels 23 are closed at inlet face 17 and open at outlet face 19. The closures of inlet channels 21 and outlet channels 23 are shown in FIG. 1 as black areas without reference numerals.

The pattern shown in a partial section in FIG. 1 of one inlet channel 21, which alternates with an outlet channel 23, continues over the entire cross-section area of the filter element in a conventional manner.

Figure 2:
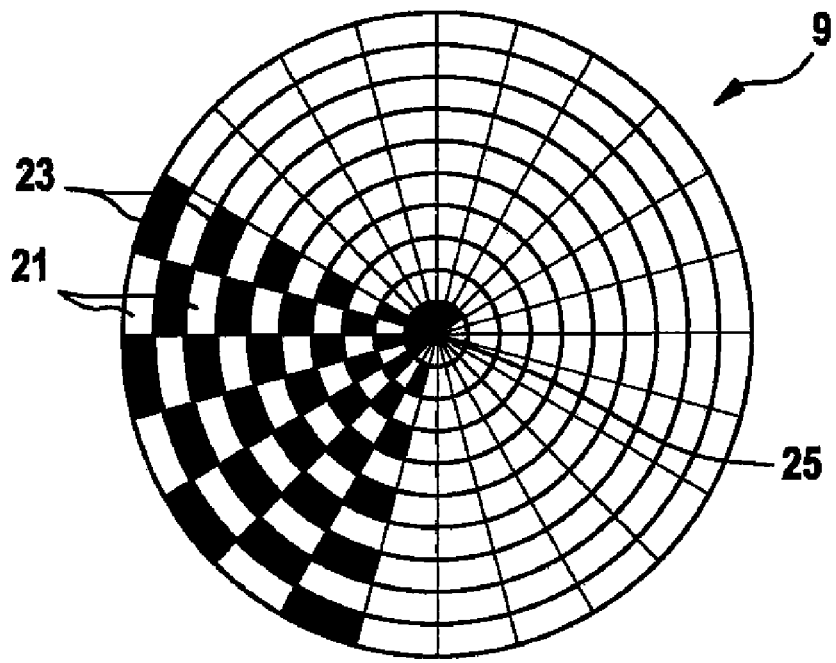
FIGS. 2 and 3 show exemplary embodiments of filter elements according to the present invention in a front view.

FIG. 2 shows a cross section through an exemplary embodiment of a filter element 9 according to the present invention.

The exemplary embodiment shown in FIG. 2 has a circular cross section and is centrally symmetrical with respect to longitudinal axis 25. Since a filter element 9 has a large number of channels, which are centrally symmetrical to longitudinal axis 25, for the sake of clarity not all channels in the cross section are shown. Inlet channels 21 are shown as white areas, while outlet channels 23 are shown as black areas.

It is obvious, however, that channels 21 and 23 pass through the entire cross-section area of filter element 9. A functional description of inlet channels 21 and outlet channels 23 was given in connection with FIG. 1, to which express reference is made again.

From FIG. 2 it is apparent that an inlet channel 21 is situated adjacent to each outlet channel 23 over the entire cross section of the first exemplary embodiment of a filter element 9 according to the present invention. This also applies to the inlet channels 21 and outlet channels 23 in the external area of filter element 9, which have a significantly larger cross-section area compared to the other inlet channels 21 and outlet channels 23. Inlet channels 21 in the area of longitudinal axis 25 are geometrically similar to inlet channels 21 at the outer diameter of filter element 9.

Due to their larger cross-section area, outer inlet channels 21 and outlet channels 23 have a lower flow resistance than inlet channels 21 and outlet channels 23 situated further inside, so that a higher flow rate of exhaust gas is established at outer inlet channels 21 and outlet channels 23. As a result, the edge areas of filter element 9 are also heated more intensely by the incoming exhaust gas, so that the temperature in the outer area of filter element 9 is raised due to channels 21 and 23 having increased cross sections. This also means, for the same heat energy supplied by the incoming exhaust gas, that the temperature inside the filter element, i.e., in the immediate vicinity of longitudinal axis 25, is reduced and thus the risk of local overheating inside filter element 9 is reduced.

Figure 3:
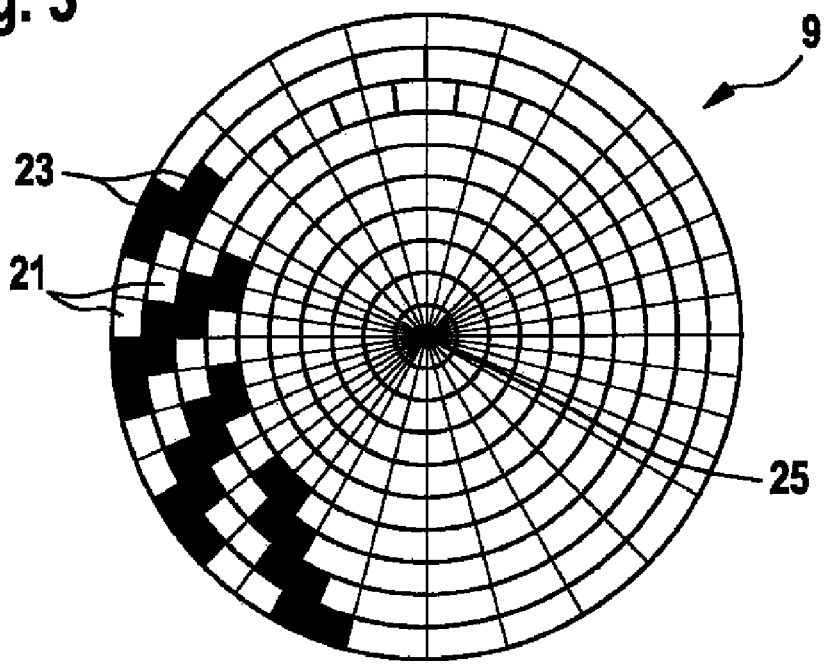

FIG. 3 shows a second exemplary embodiment of a filter element 9 according to the present invention, in which the radial filter walls (without reference numerals) are situated offset with respect to each other. This makes filter element 9 more flexible in the radial direction, so that the thermal stresses resulting from local temperature differences are reduced.

Figure 4:
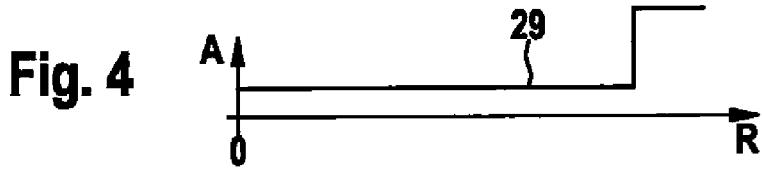
FIGS. 4 and 5 show the cross-section area of the channels as a function of the radius.

In the diagram of FIG. 4, cross-section area A of channels 21 and 23 is plotted against radius R in the form of a first line 29. This first line 29 has a stepped design having one step and thus represents the relationship between cross-section area A and the distance of channels 21 and 23 according to the exemplary embodiment depicted in FIG. 2.

Figure 5:
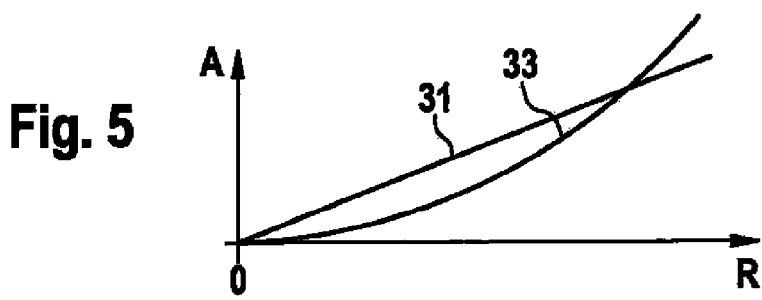

As an alternative, it would also be possible, as FIG. 5 shows, to provide a linear relationship between cross-section area A and radius R according to second line 31 or a non-linear relationship according to third line 33. Which of these qualitative relationships between cross-section area A and radius R, depicted in FIGS. 4 and 5, is given preference in an individual case depends on the circumstances of the individual case.

Figure 6:
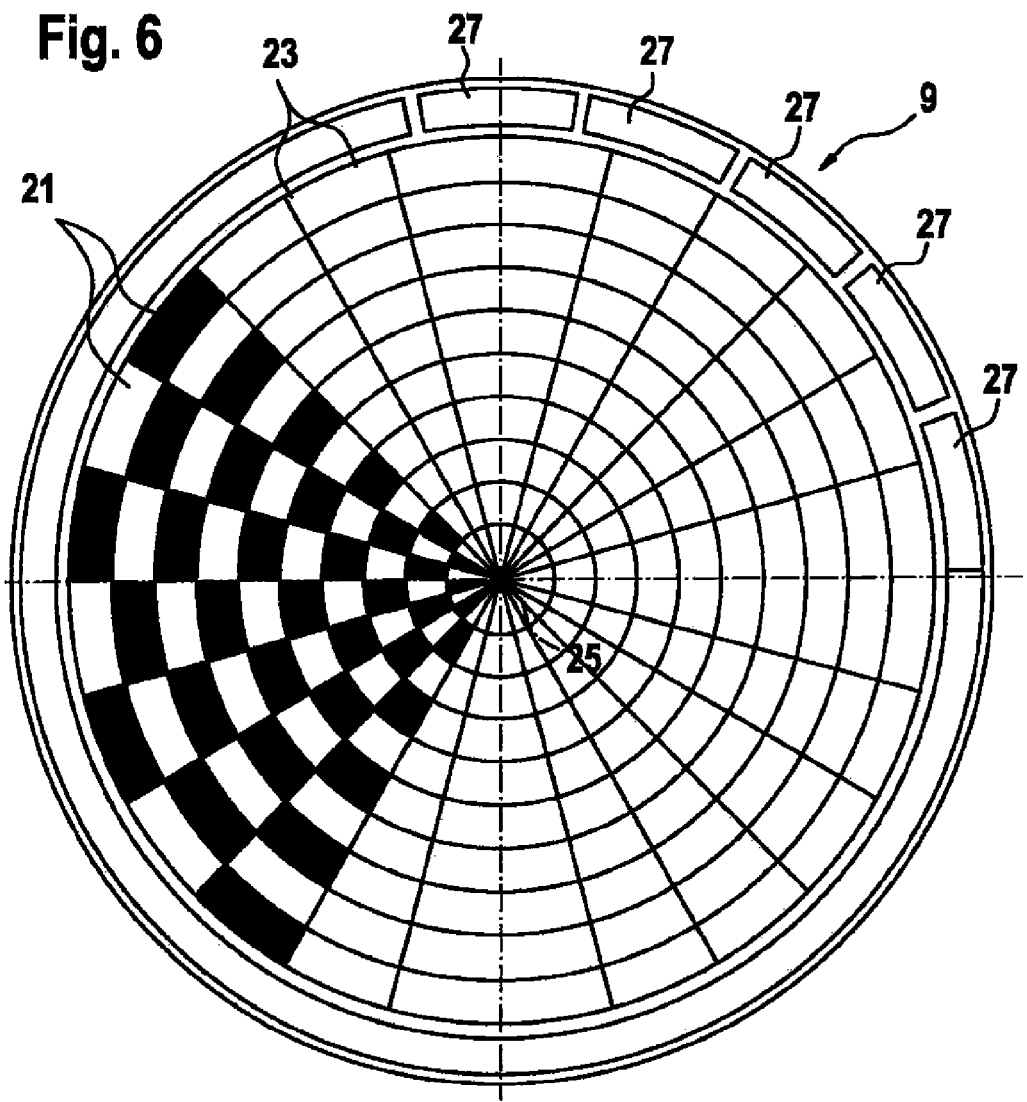
FIG. 6 shows a third exemplary embodiment of a filter element according to the present invention.

In the exemplary embodiment according to FIG. 6, a series of so-called blind channels 27, not all of which are depicted, are provided on the outer diameter of filter element 9. Blind channels 27 are closed both at their inlet area 17 and their outlet area 19, so that the exhaust gas to be purified cannot flow through them. Instead, there is more or less clean air in these blind channels 27. For the sake of clarity, only some blind channels 27 are depicted as examples, specifically over a circumference angle of approximately 90° in the first quadrant. Blind channels 27 are also provided in the other quadrants.

Since air is a poor heat conductor, the jacket of blind channels 27 on the periphery of filter element 9 acts as heat insulation, so that the heat transfer outward is reduced by blind channels 27. It also causes a rise in temperature in the outer area of filter element 9, so that the desired homogenization of temperatures over the entire cross section of the filter element is further improved.

The arrangement according to the present invention of different inlet channels 21, outlet channels 23, and/or blind channels 27 on the periphery of filter element 9 is not limited to cylindrical filter elements 9, but may also be applicable to filter element 9 having a square or rectangular cross section.

The shape of the cross-section area of inlet channels 21, outlet channels 23, and blind channels 27, which in the depicted example corresponds to a rectangle in first approximation, is also not a precondition for a filter element according to the present invention. For example, hexagonal, cross-shaped, or other shapes of cross-section areas are also possible.

Figure 7:
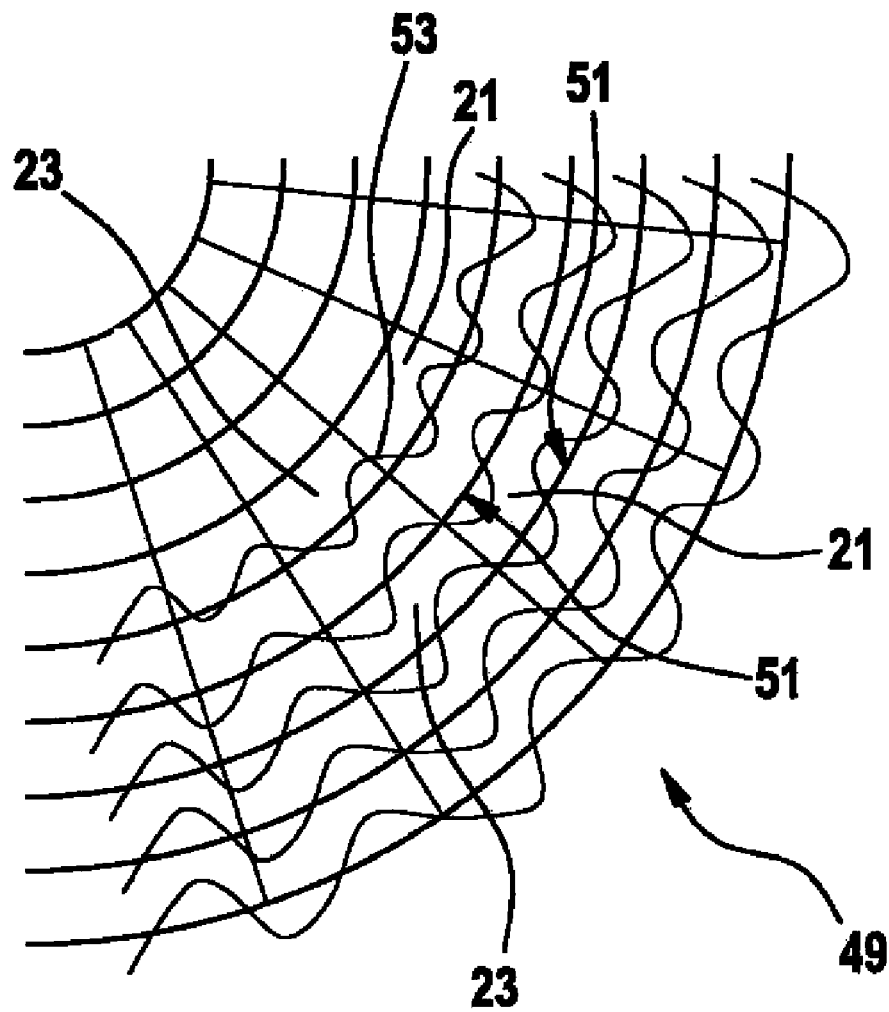
FIG. 7 shows a fourth exemplary embodiment.

In another specific embodiment of the present invention, the filter walls, i.e., the walls of the filter channels, may be structured. In particular the upstream surfaces of the inlet channels are, for example, provided with wave-type elevations. In other words: The slope of the surface is different from the slope of the plane in which the entire wall is situated only in one direction, while in a direction perpendicular thereto it corresponds to the slope of the plane in which the entire wall is situated, even in the non-planar areas. The wave-type design makes it possible to increase the effective filtering area and thus to improve the filter characteristics, in particular to reduce an exhaust gas counterpressure resulting from the operation of the motor vehicle. The filter substrate is manufactured during the manufacturing process, for example in an extrusion process, in such a way that the radial and/or concentric channel walls have a wavy structure. FIG. 7 shows in a schematic partial view (one-quarter detail) in cross section such an alternative filter element 49 in which upstream surfaces 51 of the filter walls have a wavy structure 53. The depiction of structure 53 having wavy lines symbolizes here the replacement of the planar channel walls following the generally, i.e., up to the depicted cross section, concentric circular rings by channel walls whose surfaces, at least their upstream surfaces, have a wavy structure. The depicted circular rings thus mark the average distance of the particular channel wall to the longitudinal axis of the filter element. This wavy structure is depicted in FIG. 7 for the concentric channel walls; it may also be provided alternatively or in combination for the radial channel walls. The waves are preferably sinusoidal (up to the outermost wall); alternatively they may also have other regular wave forms around the imaginary radial or concentric ideal line. Amplitude A (distance of the wave peak or wave valley to the ideal line) of this wave is in the range of 0.1 millimeter to 0.5 millimeter, preferably in a range of 0.1 millimeter to 0.3 millimeter. Period P of this wave is in the range of 0.1 millimeter to 0.5 millimeter. The amplitude height to period length ratio A/P is preferably in a range of 0.2 to 3.0. Using such wavy surface structures, the filter channels, in particular the inlet channels, have a greater extent and thus a greater filtering area compared with non-wavy filter channels having quadrangular or quasi-quadrangular cross sections and the same cross-section area.

What is claimed is:

1. A filter element for filtering exhaust gases of a diesel engine, the filter element having a longitudinal axis running parallel to a main direction of flow of the exhaust gas, a plurality of inlet channels running parallel to the longitudinal axis, and a plurality of outlet channels running parallel to the longitudinal axis, the inlet channels starting at an inlet face of the filter element and being closed at an outlet face of the filter element, and the outlet channels being closed at the inlet face and ending at the outlet face, wherein channels situated on an outside on the filter element have a greater cross-section area than centrally situated channels;
wherein radial walls run between two adjacent channels and are situated offset with respect to each other.

2. The filter element as recited in claim 1, wherein blind channels are situated outside on the filter element and are closed at both ends.

3. The filter element as recited in claim 2, wherein layers of blind channels closed at both ends are provided at an outer diameter of the filter element.

4. The filter element as recited in claim 3, wherein there are up to five layers of blind channels.

5. The filter element as recited in claim 4, wherein there are between one to three layers of blind channels.

6. The filter element as recited in claim 1, wherein a cross-section area of the channels increases monotonously with increasing distance to the longitudinal axis of the filter element.

7. The filter element as recited in claim 1, wherein a cross-section area of the channels increases in one or more steps with increasing distance to the longitudinal axis of the filter element.

8. The filter element as recited in claim 1, wherein a cross-section area of the inlet channels is greater than a cross-section area of the outlet channels at a same distance to the longitudinal axis of the filter element.

9. The filter element as recited in claim 1, wherein a cross-section area of the inlet channels is greater than a cross-section area of the outlet channels at a same distance to the longitudinal axis of the filter element by a factor between 1.1 and 2.0.

10. The filter element as recited in claim 9, wherein the factor is between 1.1 and 1.7.

11. The filter element as recited in claim 1, wherein the filter element is rotationally symmetrical or centrally symmetrical with respect to the longitudinal axis.

12. The filter element as recited in claim 1, wherein an upstream area of at least one filter wall of an inlet channel is non-planar at least in some areas.

13. The filter element as recited in claim 12, wherein the upstream area has wave-type elevations at least in some areas.

14. The filter element as recited in claim 13, wherein the wave-like elevations have at least one of a triangular and sinusoidal cross section.

15. The filter element as recited in claim 13, wherein a ratio between an amplitude and a period of the elevations is approximately between 0.2 and 3.

16. The filter element as recited in claim 12, wherein the upstream area has hill-type elevations at least in some areas.

17. A soot filter, comprising:
a filter element for filtering exhaust gases of a diesel engine, the filter element having a longitudinal axis running parallel to a main direction of flow of the exhaust gas, a plurality of inlet channels running parallel to the longitudinal axis, and a plurality of outlet channels running parallel to the longitudinal axis, the inlet channels starting at an inlet face of the filter element and being closed at an outlet face of the filter element, and the outlet channels being closed at the inlet face and ending at the outlet face, wherein channels situated on an outside on the filter element have a greater cross-section area than centrally situated channels;
a housing, the filter element situated in the housing;
a feed line coupled to the filter element at the inlet face; and
an outlet line coupled to the filter element at the outlet face;
wherein radial walls run between two adjacent channels and are situated offset with respect to each other.

* * * * *